United States Patent [19]

Zoerner

[11] Patent Number: 5,306,088
[45] Date of Patent: Apr. 26, 1994

[54] METHOD AND APPARATUS FOR MONITORING THE TEMPERATURE IN A TURBINE COMPONENT

[75] Inventor: Walter Zoerner, Baiersdorf-Igelsdorf, Fed. Rep. of Germany

[73] Assignee: Siemens Aktiengesellschaft, Munich, Fed. Rep. of Germany

[21] Appl. No.: 11,220

[22] Filed: Jan. 29, 1993

[30] Foreign Application Priority Data

Jan. 29, 1992 [DE] Fed. Rep. of Germany ....... 4202440

[51] Int. Cl.⁵ .......................... G01N 21/41; G01K 1/14
[52] U.S. Cl. ...................................... 374/131; 356/43; 374/4; 385/12
[58] Field of Search .......................... 374/153, 131, 4; 250/227.14, 227.15, 227.16; 356/73.1, 43; 385/13, 12

[56] References Cited

U.S. PATENT DOCUMENTS

| | | | |
|---|---|---|---|
| 4,151,747 | 5/1979 | Gottlieb et al. | 374/161 |
| 4,203,326 | 5/1980 | Gottlieb et al. | 374/162 |
| 4,408,827 | 10/1983 | Guthore et al. | 385/15 X |
| 4,525,626 | 6/1985 | Kush et al. | 385/13 X |
| 4,545,253 | 10/1985 | Avicola | 250/227.14 X |
| 4,734,577 | 3/1988 | Szuchy | 250/227.16 |
| 4,823,166 | 4/1989 | Hartog et al. | 374/131 X |
| 4,950,886 | 8/1990 | Claus et al. | 250/227.14 |
| 5,000,540 | 3/1991 | Nakamura | 250/227.14 X |
| 5,095,514 | 3/1992 | Curtis | 385/12 |
| 5,102,232 | 4/1992 | Tanabe et al. | 250/227.14 X |
| 5,195,359 | 3/1993 | Kubota et al. | 374/144 X |

FOREIGN PATENT DOCUMENTS

| | | |
|---|---|---|
| 0023345 | 2/1981 | European Pat. Off. . |
| 0421967 | 4/1991 | European Pat. Off. . |
| 2136809 | 2/1973 | Fed. Rep. of Germany . |
| 3811824 | 10/1988 | Fed. Rep. of Germany . |
| 3742331 | 6/1989 | Fed. Rep. of Germany . |
| 3825583 | 2/1990 | Fed. Rep. of Germany . |
| 3920840 | 6/1990 | Fed. Rep. of Germany . |
| 63-78031 | 4/1988 | Japan . |
| 2-195219 | 8/1990 | Japan . |

Primary Examiner—Daniel M. Yasich
Attorney, Agent, or Firm—Herbert L. Lerner; Laurence A. Greenberg

[57] ABSTRACT

A method for monitoring temperature in a turbine component includes detecting a change in photoconduction properties in a fiber-optical cable disposed inside a turbine component, being caused by a temperature change in the turbine component. An apparatus for monitoring temperature in a turbine component includes a fiber-optical cable disposed in the interior of a turbine component, and a device for detecting a change in photoconduction properties in the fiber-optical cable being caused by a temperature change in the turbine component.

14 Claims, 4 Drawing Sheets

METHOD AND APPARATUS FOR MONITORING THE TEMPERATURE IN A TURBINE COMPONENT

The invention relates to a method and an apparatus for monitoring the temperature in a turbine component, such as a turbine shaft bearing or a turbine blade.

Local overheating in a bearing can cause destruction of the running surface of the bearing. In a turbine bearing, what at first is merely local overheating at the running surface of a bearing shell of white metal, often leads to rapidly-spreading damage within the bearing, because of the high friction produced. Such overheating occurs as a consequence of canting of the bearing shell, for instance, or from foreign bodies carried into the bearing.

German Patent DE-PS 21 36 809 discloses monitoring the temperature in a bearing with the aid of a thermocouple. However, only a local temperature increase in the bearing can be detected in that case. Detection of temperature over a large surface area in the bearing requires the use of a great number of thermocouples distributed over the bearing surface. That in turn means that there will be a number of measurement points and extensive cables and it is therefore especially complicated and expensive.

In the operation of a turbine system, damage that leads to a lowering of efficiency of the turbine system can be caused by operationally-dictated factors. Possible causes include not only the aforementioned overheating in a turbine bearing, but also the formation of a coating on the turbine blades, foreign bodies entrained by the operating medium, erosion, or an enlargement of a radial gap between adjacent guide blades and rotor blades. Until now, such damage could only be recognized indirectly, from a change in the efficiency. Such changes are typically detected by measurements of the pressure and temperature of the operating medium at tapping points that are intended for other purposes. However, with that method, it is not possible to reliably recognize an impending malfunction and localizing damage that has already occurred in an individual turbine stage.

It is accordingly an object of the invention to provide a method and an apparatus for monitoring the temperature in a turbine component, which overcome the hereinafore-mentioned disadvantages of the heretofore-known methods and devices of this general type, which make it possible to reliably detect a temperature change in a turbine component and which do so with the lowest possible technological effort and expense with an especially suitable apparatus.

The invention is based on the recognition that the index of refraction and thus the photoconduction properties in a fiber-optical cable vary in the region of a local temperature change.

With the foregoing and other objects in view there is provided, in accordance with the invention, a method for monitoring temperature in a turbine component, which comprises detecting a change in photoconduction properties in a fiber-optical cable disposed inside a turbine component, being caused by a temperature change in the turbine component.

Upon a local temperature change in the turbine component, some of the beam of light carried inside the fiber-optical cable is scattered at the corresponding point. The light intensity at the outlet of the fiber-optical cable, reduced by the intensity of the scattered light, is accordingly a standard for the temperature change in the turbine component. Therefore, in accordance with another mode of the invention, there is provided a method which comprises ascertaining the temperature change in the turbine component from a difference between light intensities at an inlet and at an outlet of the fiber-optical cable.

In order to localize a temperature change in the turbine component, in accordance with a further mode of the invention, there is provided a method which comprises measuring the transit time of light reflected inside the fiber-optical cable, which is a function of the site of the temperature change.

With the objects of the invention in view, there is also provided an apparatus for monitoring temperature in a turbine component, comprising a fiber-optical cable disposed in the interior of a turbine component, and means for detecting a change in photoconduction properties in the fiber-optical cable being caused by a temperature change in the turbine component.

In accordance with another feature of the invention, the turbine component is a blade ring or a part of a blade ring, such as a turbine blade or a blade rim. In order to provide reliable detection of temperature changes in a single turbine stage, the fiber-optical cable is suitably disposed inside at least one guide blade of a guide blade ring. In that case, the equipment cost for measurement value processing is comparatively low, because in contrast to the rotating rotor blade ring, the guide blade ring is fixed.

In accordance with a further feature of the invention, the component is a turbine bearing, and the fiber-optical cable is disposed just beneath the running surface of the bearing in a bearing shell made of bearing material, preferably white metal.

Before the bearing is lined with white metal, the fiber-optical cable is laid in an arbitrary form over an arbitrarily large portion of the bearing. In accordance with an added feature of the invention, the fiber-optical cable is disposed in a meandering fashion over at least a portion of the bearing or bearing shell.

In accordance with an additional feature of the invention, a plurality of fiber-optical cables, preferably two of them, are disposed in different planes of the bearing. In this way, temperature detection that covers an especially large surface and thus ascertainment of the temperature profile of the entire bearing surface is attained. As a result, a temperature profile that varies as a consequence of a malfunction can advantageously also be detected. The fiber-optical cables may be disposed either inside or beneath the white metal layer.

In accordance with yet another feature of the invention, particularly for a large-sized bearing, the fiber-optical cable is laid in conduits in the bearing or inside the bearing shell. Instead of conduits, grooves with coverings may also be provided. This reliably prevents the fiber-optical cable from being torn apart by locally varying thermal expansions in the bearing.

In accordance with yet a further feature of the invention, there is provided an optical directional coupler for outputting light reflected as a result of a temperature change inside the fiber-optical cable.

In accordance with yet an added feature of the invention, the light is fed in the form of light pulses.

In accordance with yet an additional feature of the invention, there is provided a laser serving as the light source and being connected to an evaluation device such as a process computer. A light-emitting diode (LED) may also be used as the light source.

In accordance with a concomitant feature of the invention, the evaluation device is connected to the directional coupler, in order to ascertain the temperature profile inside the turbine component with the aid of the evaluation device. In the evaluation device, the temperature profile inside the turbine component is ascertained from the intensities of the reflected light and of the light at the inlet and outlet of the fiber-optical cable, and from the transit time of the reflected light. The temperature profile is displayed on a screen, preferably in three dimensions.

The advantages attained with the invention are in particular that for a comprehensive evaluation of the status of a turbine component, such as a turbine bearing or turbine blade, the temperature in the component can be monitored with only a single fiber-optical cable, thereby avoiding a great number of individual measurements. In particular, the fiber-optical cable is disposed in a close-mesh network over the length of the component, making it possible to conclude that a change in temperature has occurred by way of an approximation of measured temperature courses. This makes it possible in turn to ascertain and display a temperature profile in terms of the quantity and direction of propagation of temperature changes.

Using the fiber-optical cable to monitor the temperature of a turbine blade moreover makes it possible to ascertain temperature changes in the operating medium in the various turbine stages. A change in the temperature of the operating medium in turn makes it possible, in a simple way, for an impending lowering of efficiency of a single involved turbine stage to be recognized early.

Other features which are considered as characteristic for the invention are set forth in the appended claims.

Although the invention is illustrated and described herein as embodied in a method and an apparatus for monitoring the temperature in a turbine component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
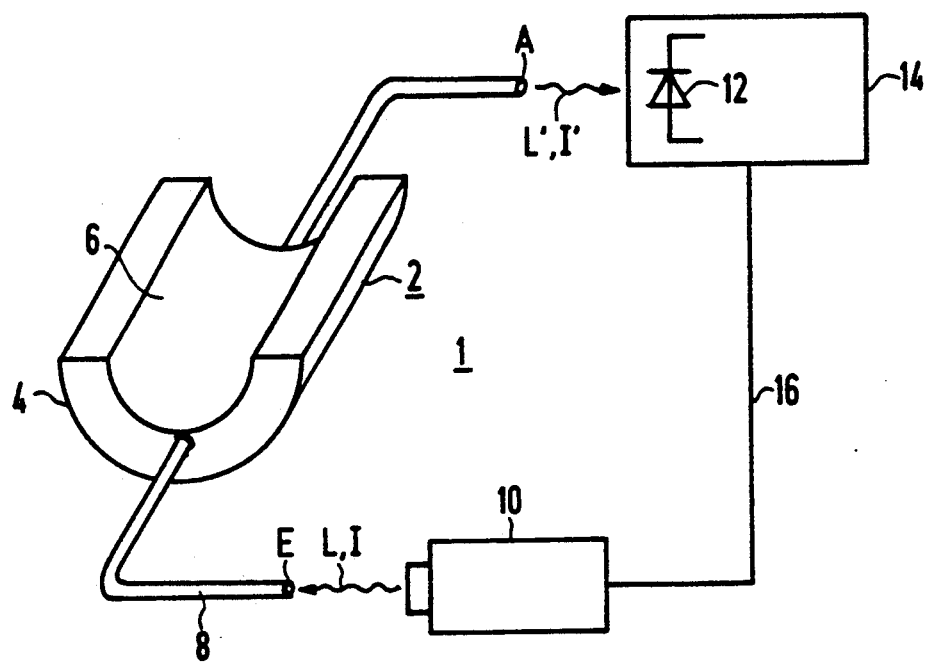
FIG. 1 is a simplified, partially diagrammatic and perspective and partially schematic view of an apparatus according to the invention with a fiber-optical cable in one bearing half of a turbine bearing.

Referring now in detail to the Figures of the drawing, in which parts that correspond to one another are identified by the same reference numerals and first, particularly, to FIG. 1 thereof, there is seen an apparatus 1 for monitoring temperature in a turbine bearing 2, of which only a lower bearing half 4 is shown. The apparatus 1 includes a fiber-optical cable 8 disposed just underneath a running surface 6 of the bearing. The fiber-optical cable 8 extends axially in a region of the greatest friction output, or in other words in a support region of the bearing 2. By way of example, the bearing 2 ma be a slide bearing of a turbine shaft.

The fiber-optical cable 8 has a diameter of approximately 0.2 mm and is surrounded by a non-illustrated outer sheath which, for instance, is made of a nickel alloy.

In order to monitor the temperature inside the bearing 2, a short, intensive light pulse L having an intensity I is input into the fiber-optical cable 8 through an inlet E thereof with the aid of a laser 10. Light L' supplied at an outlet A of the fiber-optical cable 8 is detected by a light sensor 12, such as a photodiode, and is converted into a corresponding electrical signal. The light sensor 12 is part of an evaluation device 14, which is connected to the laser 10 through a line 16. Instead of the laser 10, some other light source, such as an LED, may also be provided.

If a temperature change occurs inside the bearing 2, the photoconduction properties in the fiber-optical cable 8 change. This causes scattering losses inside the fiber-optical cable 8 and therefore a change in intensity I' of the light L' at the outlet A. This change is transmitted through the light sensor 12 to the evaluation device 14. In the evaluation unit 14, the degree of the temperature change is ascertained from the difference between the respective intensities I and I' of the light at the inlet E and the outlet A of the fiber-optical cable 8.

In order to achieve large-area temperature monitoring in the bearing 2, at least part of the fiber-optical cable 8 is advantageously disposed in meandering fashion. Examples of such a configuration are shown in FIGS. 2 and 3.

Figure 2:
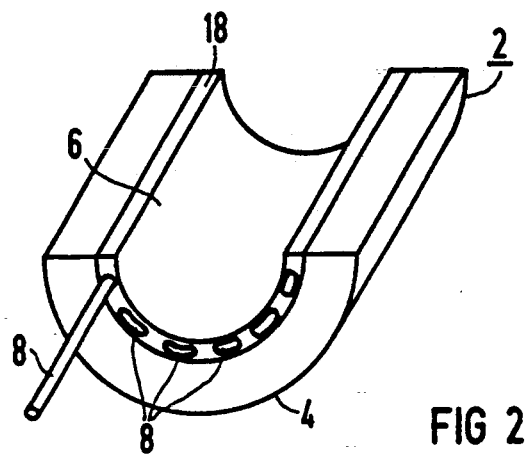
FIG. 2 is a perspective view of the bearing half of FIG. 1, with a fiber-optical cable disposed inside a bearing shell.

In the turbine bearing 2 shown in FIG. 2, the fiber-optical cable 8 is disposed inside a bearing shell 18 of white metal, which forms the running surface 6 of the bearing 2, to reduce the sliding friction. To that end, before the bearing is lined with white metal, the fiber-optical cable 8 is laid in a meandering fashion, or in the manner of a coil in the form of windings, on the inner surface of the bearing 2.

Figure 3:
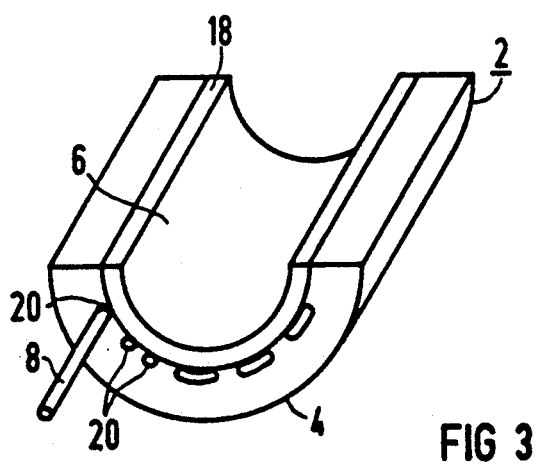
FIG. 3 is a perspective view of the bearing half of FIG. 2, with a fiber-optical cable disposed below the bearing shell.

As is shown in FIG. 3, in order to avoid damage to the fiber-optical cable 8 from locally variable thermal expansions inside the bearing, in a bearing 2 having large dimensions, the fiber-optical cable 8 is suitably laid just beneath the bearing shell 18 formed of white metal, in conduits 20. Grooves which are provided with coverings after the fiber-optical cable 8 has been laid and before the white metal has been applied, may also be provided, instead of the conduits 20, in a manner that is not shown in detail.

Figure 4:
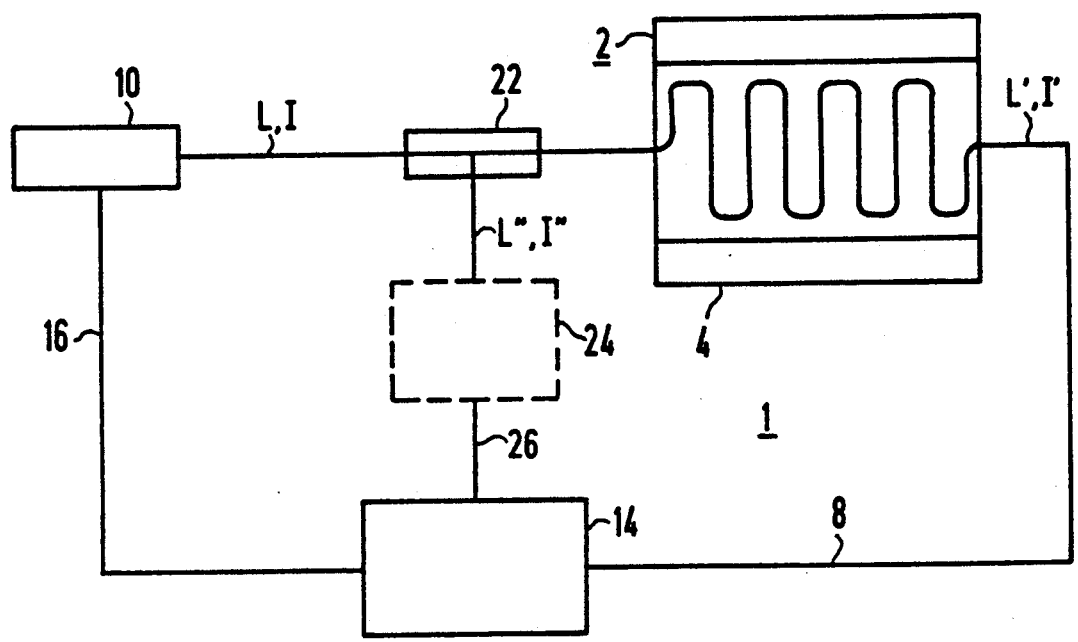
FIG. 4 is a diagrammatic and schematic view of the apparatus of FIG. 1, having a directional coupler.

FIG. 4 shows an apparatus 1 with an optical directional coupler 22 connected into the fiber-optical cable 8. Through the use of the optical directional coupler 22, light L" which is reflected in the fiber-optical cable as a result of a temperature change inside the bearing 2, is output and transmitted, optionally through an optical amplifier 24, by means of a fiber-optical cable 26 to the evaluation device 14. There, the site of the temperature change inside the bearing 2 is ascertained from the measurement of the transit time of the reflected light L" which has an intensity I".

Figure 5:
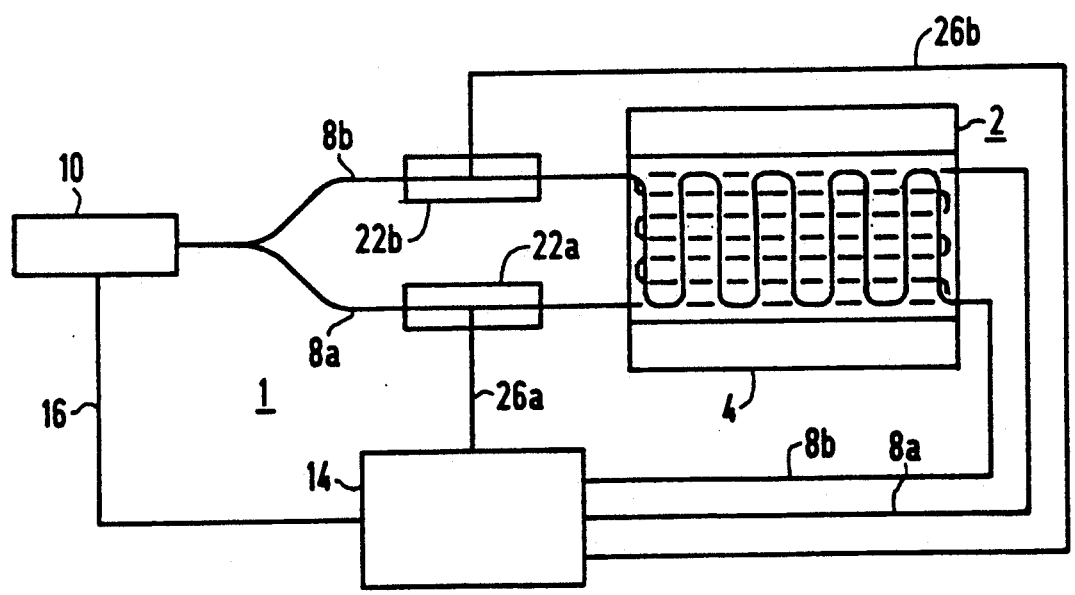
FIG. 5 is a diagrammatic and schematic view of the configuration according to FIG. 4, with two fiber-optical cables in a turbine bearing, that are disposed in gridlike fashion.

In the exemplary embodiment of FIG. 5, the fiber-optical cable is split into two branches 8a and 8b, which are disposed in gridlike fashion in two planes in the bearing half 4 of the bearing 2. Large-area temperature monitoring is accordingly achieved. Each branch 8a and 8b includes one respective directional coupler 22a and 22b and these are each connected to the evaluation device 14 through a respective fiber-optical cable 26a and 26b.

In the evaluation device 14, the temperature profile in the bearing 2 is ascertained from the intensities I, I' and I" and the transit time of the reflected light L", for instance by means of a computer, and is displayed on a non-illustrated screen in two or three dimensions.

Due to the disposition of the branches 8a and 8b in two planes as is shown in FIG. 5, the temperature distribution over the running surface 6 of the bearing 2 is integrally detected, assuring a comprehensive evaluation of the status of the bearing. The measurement accuracy along one meter of the fiber-optical cable is approximately 1° C.

Figure 6:
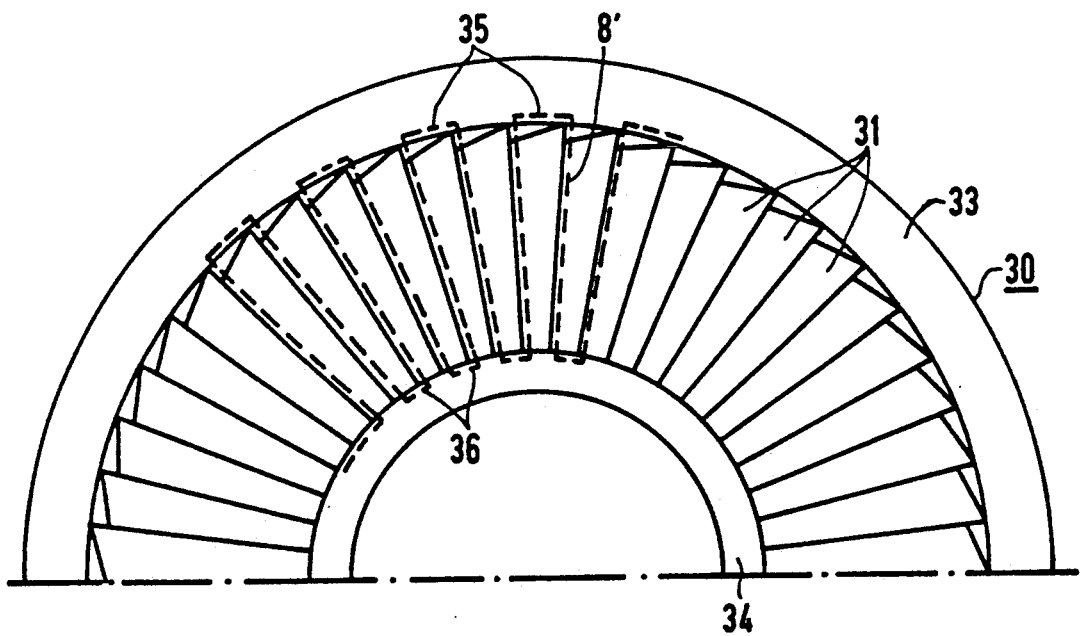
FIG. 6 is a fragmentary, elevational view of a configuration of a fiber-optical cable in a guide blade ring of a turbine stage.

FIG. 6 shows one half of a guide blade ring 30 having a number of guide blades 31. The guide blade ring 30 is part of a turbine stage, for instance a low-pressure stage of a steam turbine. The guide blade ring 30 includes respective outer and inner blade rims 33 and 34 and the guide blades 31 are secured in these rims. A fiber-optical cable 8' is preferably disposed inside non-illustrated conduits, which extend radially through the guide blades 31. The fiber-optical cable 8' is located inside the outer and inner blade rims 33 and 34 at respective turning points 35 and 36.

Placing fiber-optical cables in turbine system parts, such as in the leading and trailing portions of turbine housings, in the condensor, or in a heat exchanger on the steam and water side, makes it possible to monitor the steam or condensate temperatures indirectly. To that end, the fiber-optical cable is often disposed on or in a separate carrier.

I claim:

1. A method for monitoring temperature in a turbine bearing, which comprises:
    detecting a change in photoconduction properties in a fiber-optical cable disposed in a meandering fashion inside a turbine bearing underneath a running surface of the turbine bearing and across at least a portion of the turbine bearing, wherein the change in photoconduction properties is caused at a site by a temperature change in the turbine bearing, and determining therefrom the site of the temperature change.

2. The method according to claim 1, which comprises ascertaining the temperature change in the turbine component from a difference between light intensities at an inlet and at an outlet of the fiber-optical cable.

3. The method according to claim 1, which comprises measuring a transit time of light being reflected inside the fiber-optical cable as a function of a site of a temperature change.

4. An apparatus for monitoring temperature in a turbine bearing having a running surface, comprising:
    a fiber-optical cable disposed in a meandering fashion in the interior of a turbine bearing underneath a running surface of the turbine bearing and across at least a portion of the turbine bearing, and means for detecting a change in photoconduction properties in the fiber-optical cable being caused by a temperature change in the turbine bearing.

5. The apparatus according to claim 4, wherein the turbine bearing has a bearing shell of bearing material and said fiber optical cable is disposed in the bearing material.

6. The apparatus according to claim 5, wherein said fiber-optical cable is disposed inside axially extending conduits formed in the bearing shell.

7. The apparatus according to claim 6, wherein the bearing material is white metal.

8. The apparatus according to claim 6, wherein said fiber-optical cable is disposed inside axially extending conduits formed in the bearing.

9. The apparatus according to claim 4, including an optical directional coupler for outputting reflected light.

10. The apparatus according to claim 9, wherein said detecting means are an evaluation device connected to said directional coupler, and including a laser light source connected to said evaluation device.

11. The apparatus according to claim 4, wherein said detecting means are an evaluation device, and including a laser light source connected to said evaluation device.

12. The apparatus according to claim 4, including at least one other fiber-optical cable, said fiber-optical cables being disposed in different planes.

13. The apparatus according to claim 4, including another fiber-optical cable, said two fiber-optical cables being disposed in different planes.

14. The apparatus according to claim 4, including means for feeding light in the form of light pulses to said fiber-optical cable.

* * * * *